United States Patent [19]
Harrison

[11] 3,865,556
[45] Feb. 11, 1975

[54] CERMET COMPOSITION CONTAINING CBC MO AND AN ADDITIONAL CARBIDE

[75] Inventor: Robert W. Harrison, Portland, Conn.

[73] Assignee: The United States of America as represented by the United States Atomic Energy Commission, Washington, D.C.

[22] Filed: May 29, 1961

[21] Appl. No.: 113,565

[52] U.S. Cl. .................................. 29/182.7, 75/203
[51] Int. Cl. ...................... C22c 29/00, C22c 31/04
[58] Field of Search ............ 75/204, 203; 29/182.8, 29/182.7

[56] References Cited
UNITED STATES PATENTS

| 1,848,899 | 3/1932 | McKenna | 29/182.8 |
| 2,123,574 | 7/1938 | McKenna II | 29/182.7 |
| 2,123,576 | 7/1938 | McKenna III | 29/182.7 |
| 2,198,343 | 4/1940 | Kieffer | 29/182.7 |
| 2,791,025 | 5/1957 | Kiefeld | 29/182.7 |

OTHER PUBLICATIONS

Schwarzkopf & Kieffer (I), "Refractory Hard Metals," the MacMillan Co., N.Y., 1953 pp. 86, 96, 111, and 160.

Schwarzkopf & Kieffer (II) "Cemented Carbides" the Macmillan Co., N.Y., 1960 pp. 202, 204-205, 212 and 216

*Primary Examiner*—Benjamin R. Padgett
*Assistant Examiner*—Brooks H. Hunt
*Attorney, Agent, or Firm*—Roland A. Anderson; John A. Horan; Joseph J. Natoli

[57] ABSTRACT

1. A hard dense high-temperature material compatible with lithium consisting of CbC and Mo to which has been added up to 15 w/o of a refractory metal carbide selected from the group consisting of WC, TiC, and ZrC.

1 Claim, No Drawings

CERMET COMPOSITION CONTAINING CBC MO AND AN ADDITIONAL CARBIDE

This invention relates to a high-temperature, high-hardness cermet composed of CbC and Mo.

It has been discovered that when mixtures of fine CbC powders and fine Mo powder are sintered at high temperature (3,500°F), they form a liquid-phase bonded cermet that is both hard and dense. This material shows no reaction when exposed to corrosive mediums and is completely compatible with lithium at 1,800°F.

Many lithium-compatible compositions of cermets were investigated. The CbC-Mo was the only composition which showed an increase in density with sintering.

One of the objects of this invention is, therefore, to provide a high-temperature lithium-compatible cermet which increases in density with sintering.

This material is useful for bearings, seals, valve bodies and hardfaced, wear-resistant coatings that are required to operate in a high-temperature liquid-metal environment. For example, a sleeve bearing composed of this material could run submerged in and be lubricated by a liquid metal (including lithium) at nuclear reactor temperatures.

Cermets of this invention range from composition of 10 w/o CbC — 90 w/o Mo to 90 w/o CbC — 10 w/o Mo. The cermets are readily prepared by sintering powdered mixtures of metal and refractory. Tests prove that the preferred range of CbC is 20–30% for a bearing application. Below 20% CbC it was found that there was insufficient liquid phase to get satisfactory bonding (liquid phase thought perhaps to be a ternary mixture of Cb-Mo-C). Above 30% CbC the effects of the hard constituent CbC reduces sinterability. The 20–30% CbC appears to give the most dense cermet composition.

The following example illustrates the preparation of a bearing cermet:

A mix of −270 mesh Mo powder and −325 mesh CbC powder is blended in a ratio of 25 w/o CbC — 75 w/o Mo. This mix is ball-milled with 2% by weight phenol-formaldehyde resin in a steel mill with steel balls for 20 hours. Bearing compacts are pressed in steel dies at 250°F and 4 TSI, thus setting the resin. The compacts, so prepared, have a green density of 55% of theoretical and can be handled easily. Sintering is done in an induction-heated vacuum furnace at 3,500°F for 3½ hours at a pressure of less than 1 micron. After-sintering densities vary from 95 – 100% of theoretical. The 25 w/o CbC — 75 w/o Mo, when prepared as above set forth with a binder, can be machined following pressing. After sintering, however, it has to be ground to finished dimensions. The finished bearings are produced by grinding with SiC or fine diamond to a tolerance of ±0.001 inch. Lapping with ½ micron diamond dust in cashmere cloth produces a finish of 1 micro inch.

Tests on the bearing cermets show that there is a low coefficient of friction and no galling or seizing when the cermets are run against each other at elevated temperatures in lithium. This cermet has a Rockwell hardness of between $R_C$ 62–64, a coefficient of thermal expansion of $3.36 \times 10^{-6}$ in/in °F at 1,600°F and $3.34 \times 10^{-6}$ in/in °F at 1,800°F, and is lithium corrosion resistant to the degree of losing only 0.29 mg/cm$^2$ of weight when exposed to a lithium medium in a tilting capsule test for 100 hours at about 1,800°F with a 400°F temperature differential.

If a particular application requires greater hardness, it is possible to add small amounts (up to 15%) of WC, TiC or ZrC. These additions of refractory metal carbides serve to increase the hardness while still maintaining the good properties indicated above. They will, however, result in a reduction in density. This might be advantageous in some instances when a hardness increase of five times is balanced against a density decrease of perhaps 5%. If these metal carbides are added, it will usually result in a bearing which is so hard and fragile that it must be pressed to very nearly the correct dimensions since it cannot be machined and must be ground to its exact dimension.

In testing the bearing in a lithium environment at 1,800°F, both the rotating and staionary members were CbC-Mo cermet. In some cases it might be desirable to make one of the members of Mo-½Ti with carburized surface. It seems to make no difference which member, the rotating or the stationary, is cermet.

I claim:

1. A hard dense high-temperature material compatible with lithium consisting of CbC and Mo to which has been added up to 15 w/o of a refractory metal carbide selected from the group consisting of WC, TiC, and ZrC.

* * * * *